(12) United States Patent  (10) Patent No.: US 7,641,272 B2
Nydam  (45) Date of Patent: Jan. 5, 2010

(54) VEHICLE BODY STRUCTURE

(75) Inventor: Scott Nydam, Farmington Hills, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 87 days.

(21) Appl. No.: 12/033,767

(22) Filed: Feb. 19, 2008

(65) Prior Publication Data

US 2009/0206635 A1    Aug. 20, 2009

(51) Int. Cl.
   *B62D 25/06*    (2006.01)
(52) U.S. Cl. .................................... 296/210; 296/26.04
(58) Field of Classification Search ................ 296/210, 296/26.04; 29/401.1
   See application file for complete search history.

(56) References Cited

U.S. PATENT DOCUMENTS 2,382,923 A  *  8/1945  Trautvetter ................. 296/201
6,315,351 B1 * 11/2001 Mondragon Sarmiento et al. ...................... 296/190.08
6,883,860 B1 *  4/2005  Budge ................... 296/190.08
6,983,983 B2 *  1/2006  Lee ............................ 296/201
7,165,806 B2     1/2007  Osterberg et al.

* cited by examiner

*Primary Examiner*—Dennis H Pedder
(74) *Attorney, Agent, or Firm*—Global IP Counselors, LLP (57) ABSTRACT

A vehicle body structure includes a roof panel, a front structural support member and an optional extension member. The front structural support member includes a first A-pillar attachment end, a second A-pillar attachment end, a front edge extending between the first and second A-pillar attachment ends and a rear edge extending between the first and second A-pillar attachment ends. In a first configuration, the roof panel attaches to the front edge and also to another region of the front structural support member. In a second vehicle configuration, the extension member is attached a rear edge of the front structural support member and extends to a position on the roof panel that is located vertically above the front structural support member when the front structural support member is in an installed orientation.

23 Claims, 9 Drawing Sheets

FIG. 9

VEHICLE BODY STRUCTURE

BACKGROUND OF THE INVENTION

1. Field of the Invention

The present invention relates to a vehicle body structure that includes a front structural support member. More specifically, the present invention relates to a vehicle body structure that includes a front structural support member that can be used in the body structure of multiple vehicle configurations.

2. Background Information

Many vehicle manufacturers design and manufacture a basic vehicle body configuration and then further additional vehicle models that include one or more design variations. Such design variations fulfill different transportation needs and markets. For example, there are utility van designs that are marketed with a plurality of roof panel configurations. In the base utility van design, a low profile roof panel is typically installed on the vehicle body structure's roof supporting elements. In this base utility van design, it is not possible for a six-foot tall passenger to stand within the vehicle. In one design variation, a taller high profile roof panel is installed to the body structure. In order to adequately support the high profile roof panel, a re-designed front structural support member above the windshield and redesigned side roof rails are currently required.

The design and manufacture of multiple parts for variations in a base body design is costly, requires increased inventory of body elements and increased storage space to store such additional body elements prior to assembly.

In view of the above, it will be apparent to those skilled in the art from this disclosure that there exists a need for an improved vehicle body structure that can include body elements common to two or more body design variations. This invention addresses this need in the art as well as other needs, which will become apparent to those skilled in the art from this disclosure.

SUMMARY OF THE INVENTION

One object of the present invention is to design and manufacture a single structural member that can be used in a plurality of vehicle body designs.

Another object of the present invention is to design and manufacture a vehicle body structure that can include structural members that can also be used in other vehicle body structures with differing designed elements or features.

In accordance with one aspect of the present invention, there is a method of assembling first and second vehicle body structures that includes forming at least two identical front structural support members with each of the front structural support members including a first A-pillar attachment end, a second A-pillar attachment end, a front edge extending between the first and second A-pillar attachment ends and a rear edge extending between the first and second A-pillar attachment ends. The method also includes installing a first roof panel to a first of the front structural support members, with the first roof panel being disposed at a first height above the rear edge of the first of the front structural support members to form the first vehicle body structure. The method further includes forming at least one extension member for a second of the front structural support members and attaching the extension member to the second of the front structural support members to extend vertically from the second of the front structural support members. The method also includes installing a second roof panel to the extension member on the second of the front structural support members with the second roof panel being disposed at a second height above the rear edge of the second of the front structural support members to form the second vehicle body structure.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
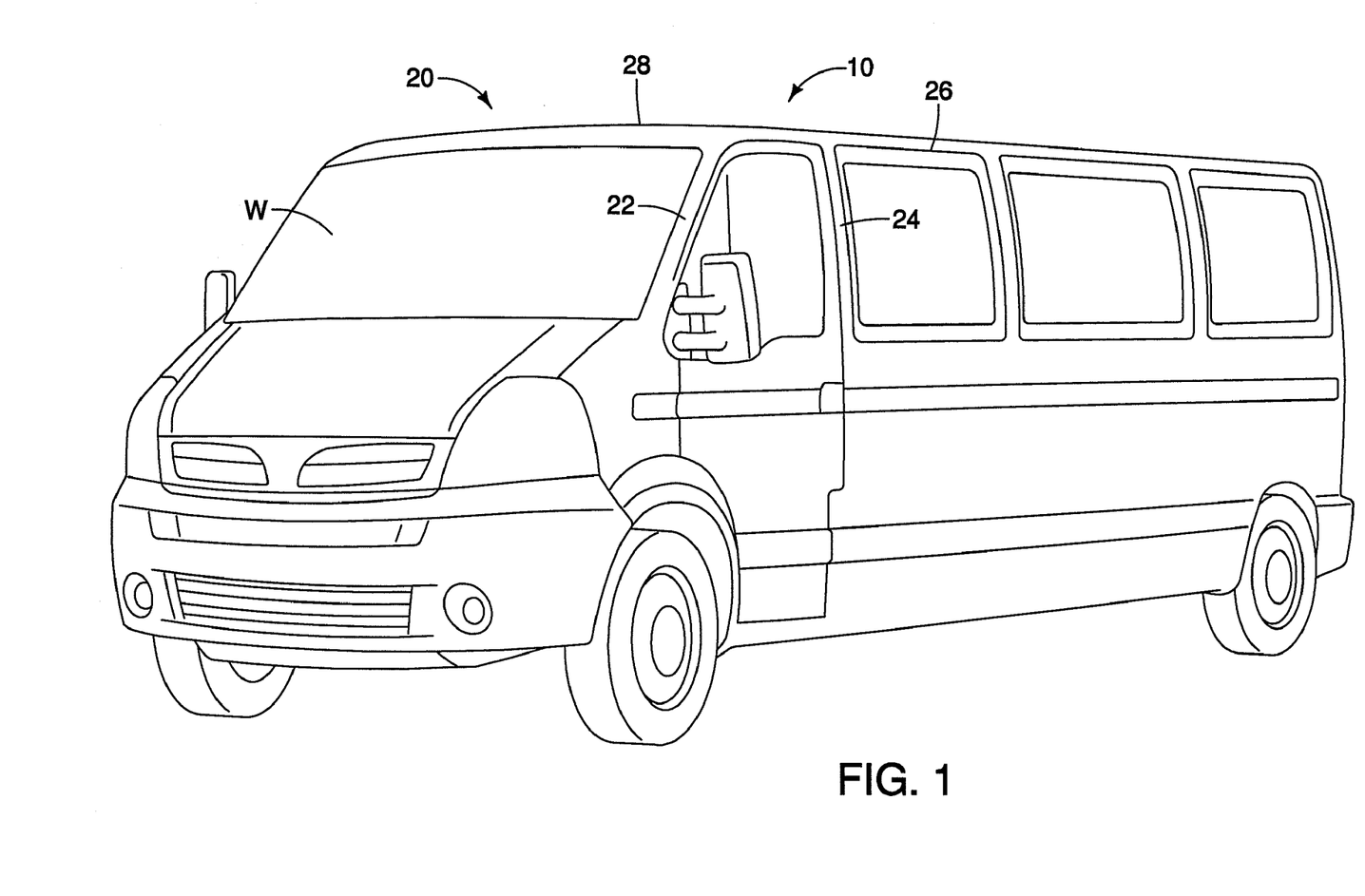
FIG. 1 is a perspective view of a first vehicle that has a first roof panel and includes a front structural support member in accordance with the present invention.
Figure 2:
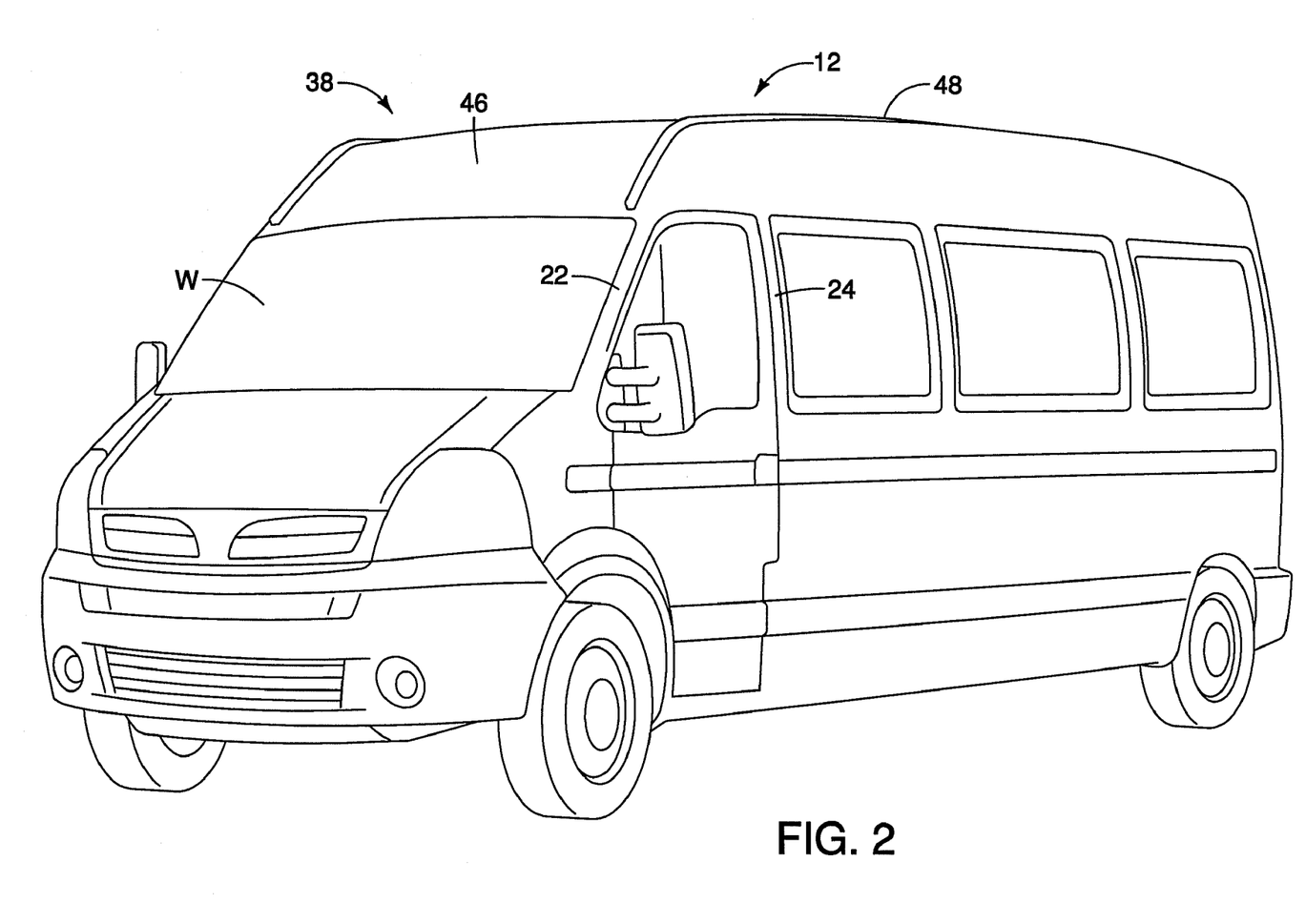
FIG. 2 is a perspective view of a second vehicle that has a taller second roof panel and includes a front structural support member in accordance with the present invention.

Referring initially to FIGS. 1 and 2, vehicles 10 and 12 are illustrated in accordance with a first embodiment of the present invention. The vehicles 10 and 12 both include a front structural support member 14, shown in FIGS. 3-9, that is described in greater detail below.

Specifically, the front structural support member 14 is a single structural member that is configured for use in the assembly of a plurality of different vehicles, such as vehicles 10 and 12. In other words, the front structural support member 14 is a universal member that can be used in the assembly of several different vehicles, not just a single vehicle or single vehicle configuration. Prior to describing the front structural support member 14, a brief description of each of the vehicle 10 and the vehicle 12 is provided.

Figure 3:
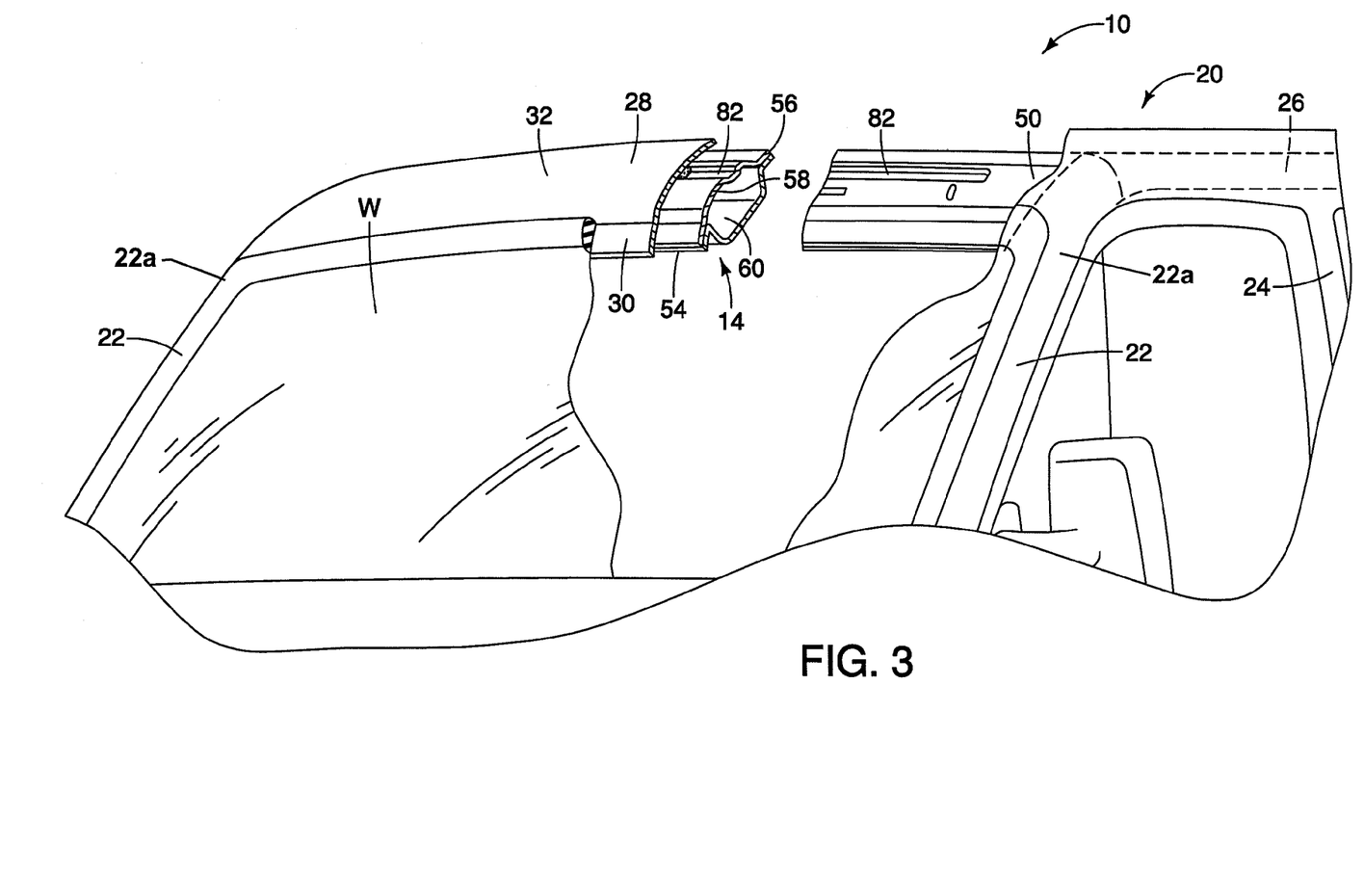
FIG. 3 is another perspective view of the first vehicle showing a portion of the first roof panel cutaway to reveal the front structural support member in accordance with the present invention.

As shown in FIGS. 1 and 3, the vehicle 10 is depicted as a van or light truck. However, it should be understood from the drawings and the description herein that the vehicle 10 can be any of a variety of vehicle configurations and is not limited to a van or light truck.

The vehicle 10 has a vehicle body structure 20 that includes a variety of structural elements. However, in the description of the present invention, only a limited number of those elements are described for the sake of brevity. As shown in FIGS. 1 and 3, the vehicle body structure 20 includes (among other things) A-pillars 22, B-pillars 24, side roof rails 26 (only one visible in FIG. 3), a roof panel 28 and the front structural support member 14 (shown in FIG. 3 only). The A-pillars 22 and the front structural support member 14 at least partially define an opening that is dimensioned to receive and support a windshield W.

The A-pillars 22 are contoured elements that extend upward and rearward along the edge of the windshield W. Upper ends 22a of the A-pillars 22 are shaped and dimensioned to attach to the side roof rails 26 and to the front structural support member 14. The B-pillars 24 are conventional elements whose upper ends attach to the side roof rails 26. The A-pillars 22 and the B-pillars 24 are dimensioned and configured in a conventional manner to define conventional front door openings of the vehicle body structure 20. The side roof rails 26 are conventional structural elements.

Figure 5:
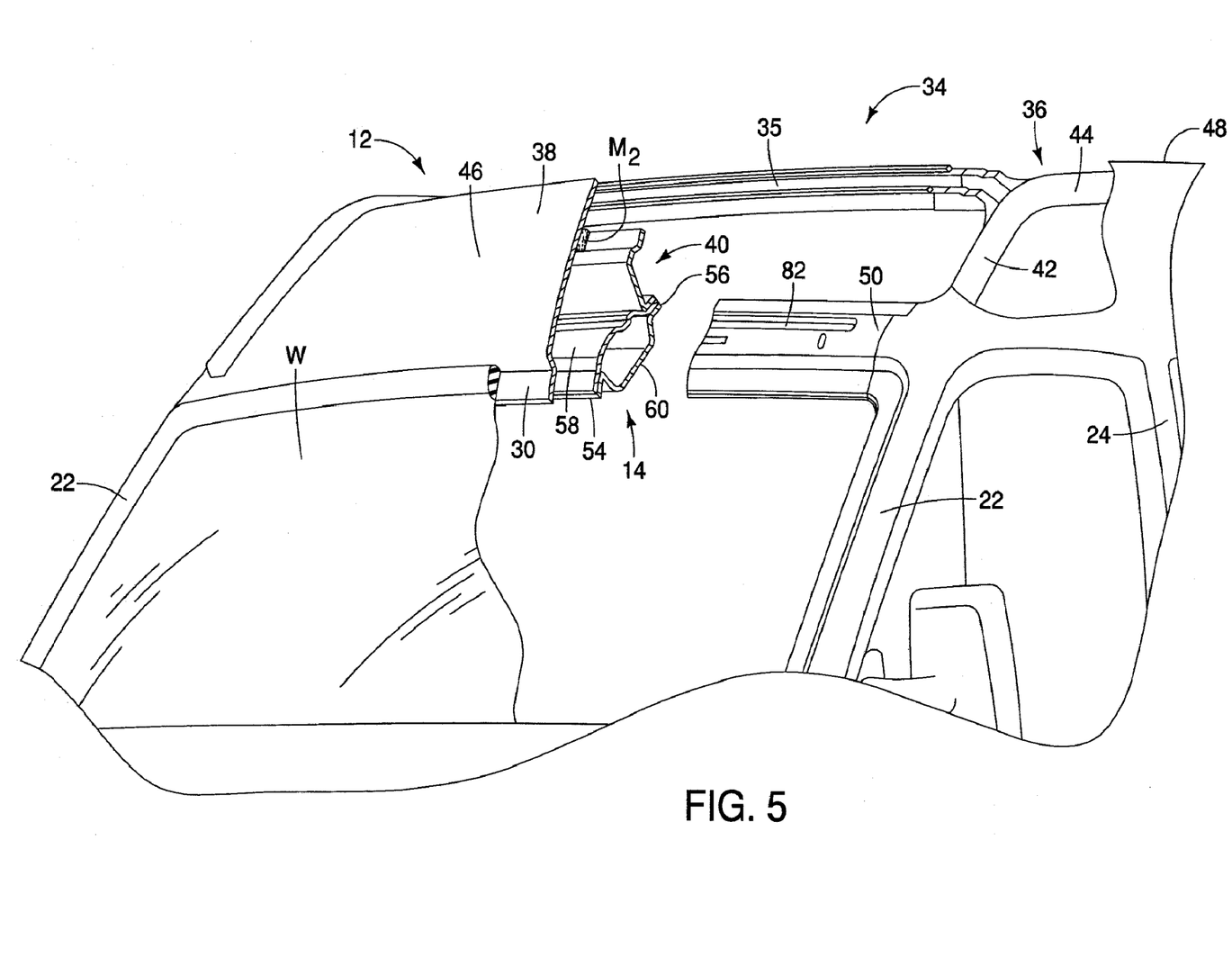
FIG. 5 is another perspective view of the second vehicle showing a portion of the second roof panel cutaway to reveal the front structural support member and an extension member in accordance with the present invention.
Figure 8:
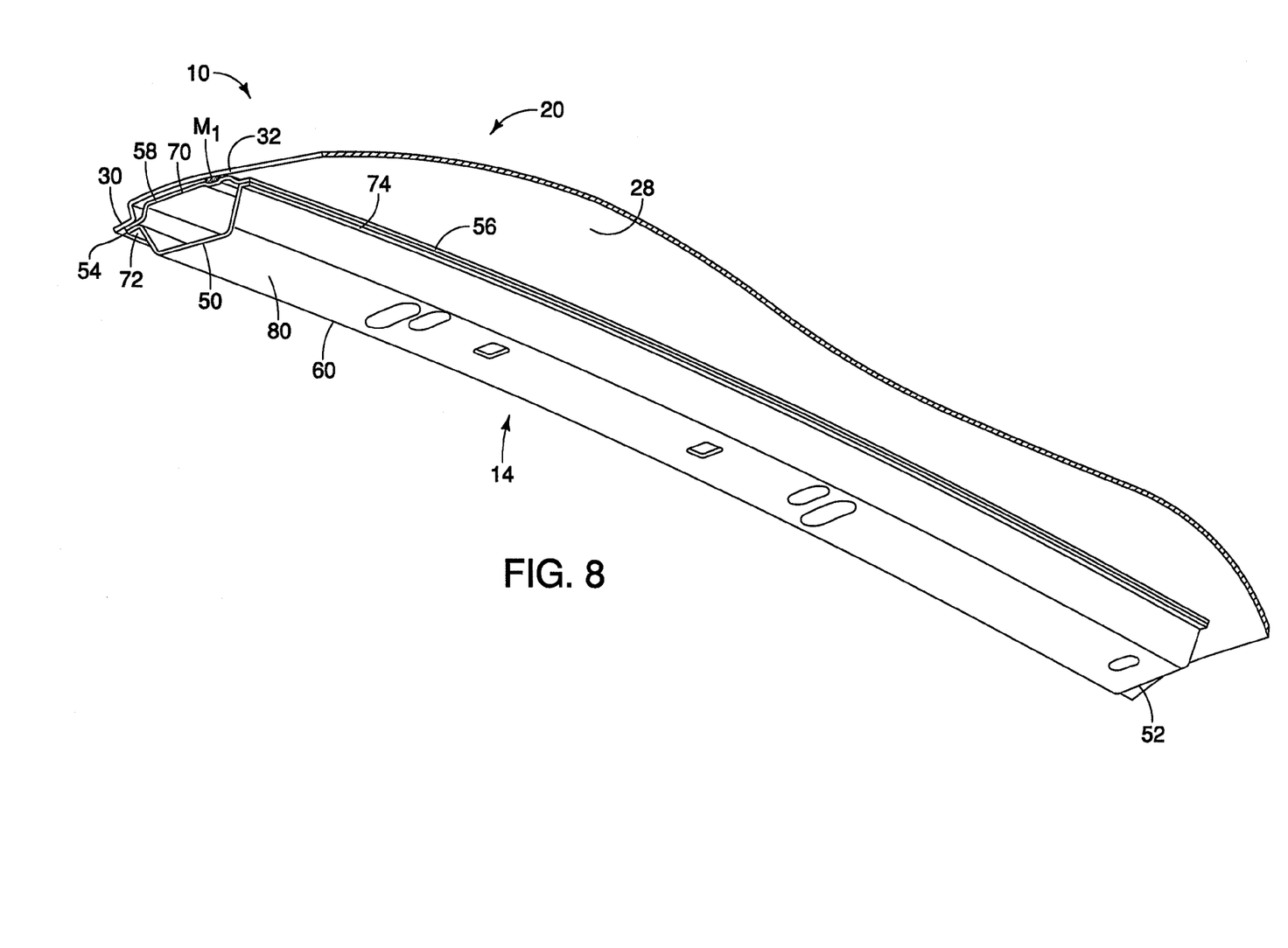
FIG. 8 is a part cross-sectional perspective view of the front portion of the first vehicle looking upward showing details of the front structural support member and the first roof panel in accordance with the present invention.

As indicated in FIGS. 3, 5 and 8, the roof panel 28 is also a conventional element of the vehicle body structure 20 that attaches along lateral sides to the side roof rails 26 and attaches to the front structural support member 14, as described in greater detail below. The roof panel 28 includes a front flange 30 and a forward roof portion 32. The front flange 30 is dimensioned to extend laterally side to side between the A-pillars 22. The forward roof portion 32 is dimensioned to extend from the front flange 30 rearward and between the side roof rails 26.

Although the front structural support member 14 is part of the vehicle body structure 20 of the vehicle 10, a description of the front structural support member 14 is provided after a description of the vehicle 12.

As shown in FIGS. 2 and 5, the vehicle 12 has a vehicle body structure 34 that includes many of structural elements of the vehicle body structure 20 the vehicle 10. For example, the vehicle body structure 34 includes the A-pillars 22, the B-pillars 24, roof bows 35 (FIG. 5 only), the front structural support member 14 and the windshield W. However, the vehicle body structure 34 includes raised side roof rails 36 (only one visible in FIG. 5) a raised roof panel 38 and an extension member 40. A plurality of roof bows 35 are included in the vehicle body structure 34. However, only one of the roof bows 35, the forward-most roof bow 35, is depicted in FIG. 5. Each of the conventional roof bows 35 extends laterally between the raised roof rails 36 in a conventional manner.

The raised side roof rails 36 each include a forward sloped section 42 and a rail portion 44. Each of the forward sloped sections 42 have an inclined contour that follows the contour of the A-Pillars 22 but extends further upward above the A-pillars 22 than the roof panel 28 of the vehicle 10. The rail portion 44 of the raised side roof rails 36 has a slight arcuate contour. Thus the forward sloped section 42 and the rail portion 44 of the raised side roof rails 36 provide an overall roof structure that is higher than is possible with the configuration of the side roof rails 26 of the vehicle 10. In other words, the vehicle 12 has a raised roof that provides additional vertical interior space to the vehicle 12, compared to the vehicle 10.

Figure 6:
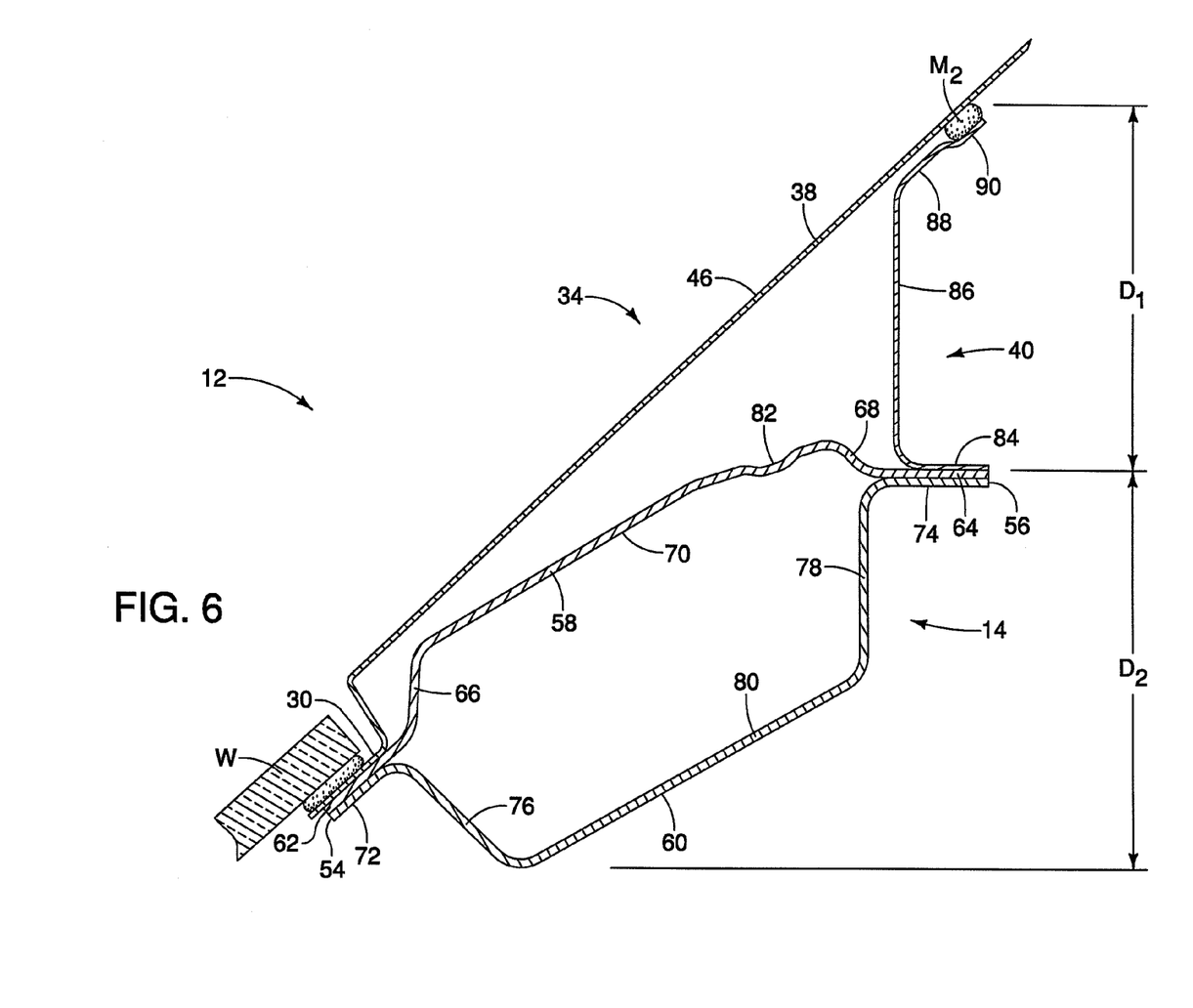
FIG. 6 is a cross sectional view of a front portion of the second vehicle showing details of the front structural support member, the extension member and the second roof panel in accordance with the present invention.
Figure 9:
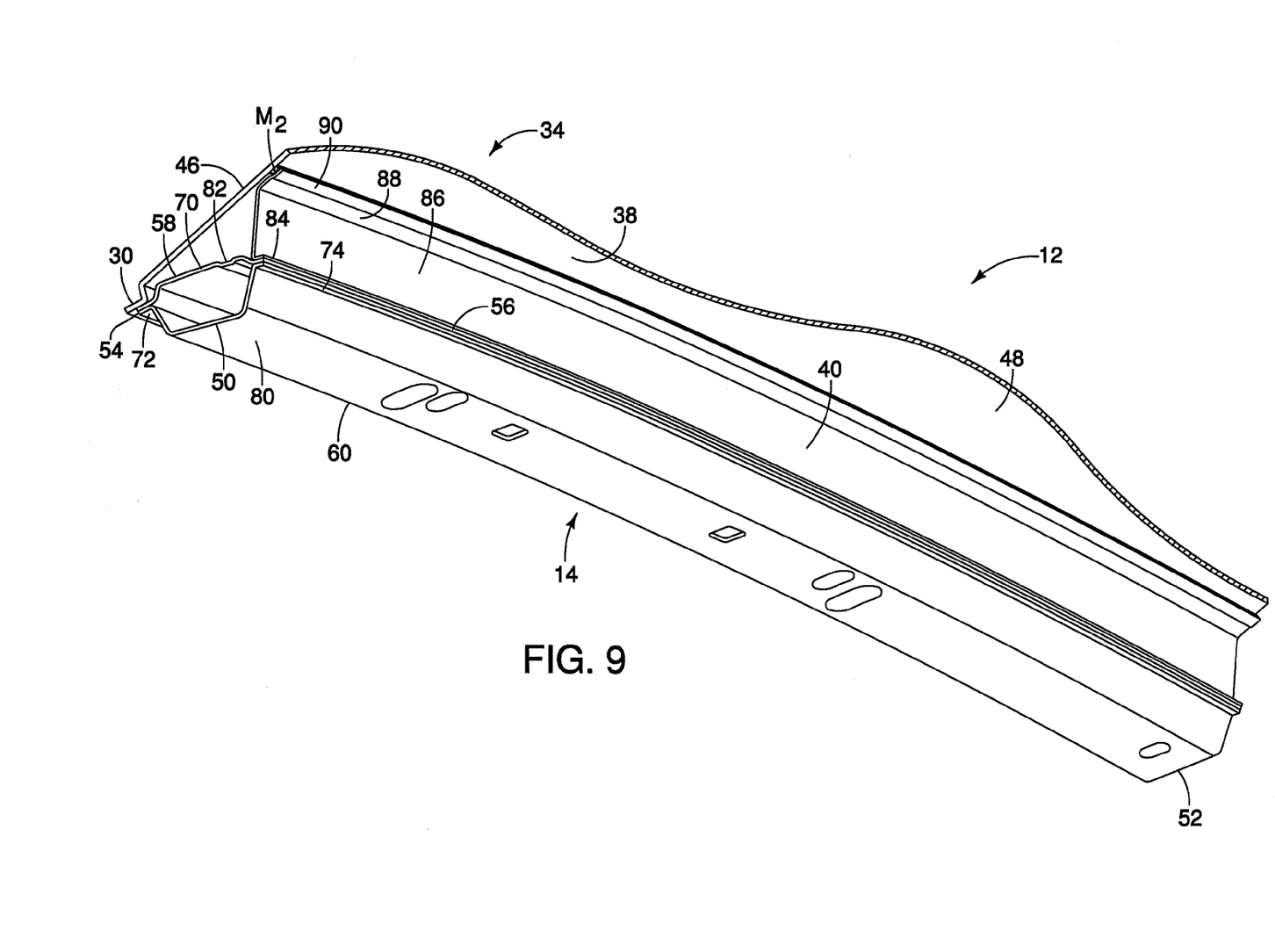
FIG. 9 is a part cross-sectional perspective view of the front portion of the second vehicle looking upward showing details of the front structural support member, the extension member and the second roof panel in accordance with the present invention.

As shown in FIGS. 5, 6 and 9, the raised roof panel 38 includes the front flange 30, a forward sloped roof portion 46 and an upper roof portion 48. The front flange 30 is dimensioned to extend laterally side to side between the A-pillars 22. The forward sloped roof portion 46 extends upward from the front flange 30 a pre-determined distance above the upper ends of the A-pillars 24 and laterally side-to-side between the forward sloped portions 42 of the raised side roof rails 36. The upper roof portion 48 of the raised roof panel 38 is dimensioned to extend rearward from the forward sloped roof portion 46 to the end of the vehicle 12 and side-to-side between the rail portions 44 of the raised side roof rails 36.

The extension member 40 is described in greater detail below following a description of the front structural support member 14.

A description of the front structural support member 14 is now provided with reference to FIGS. 3-9. The front structural support member 14 is an elongated support member that includes a first A-pillar attachment end 50, a second A-pillar attachment end 52, a front edge 54 and a rear edge 56. The front edge 54 extends in a lateral vehicle direction between the first and second A-pillar attachment ends 50 and 52 and the rear edge 56 extends in the lateral vehicle direction between the first and second A-pillar attachment ends 50 and 52. As shown in FIGS. 3-6, the front edge 54 of the front structural support member 14 is configured to support an upper edge of the windshield W.

Figure 4:
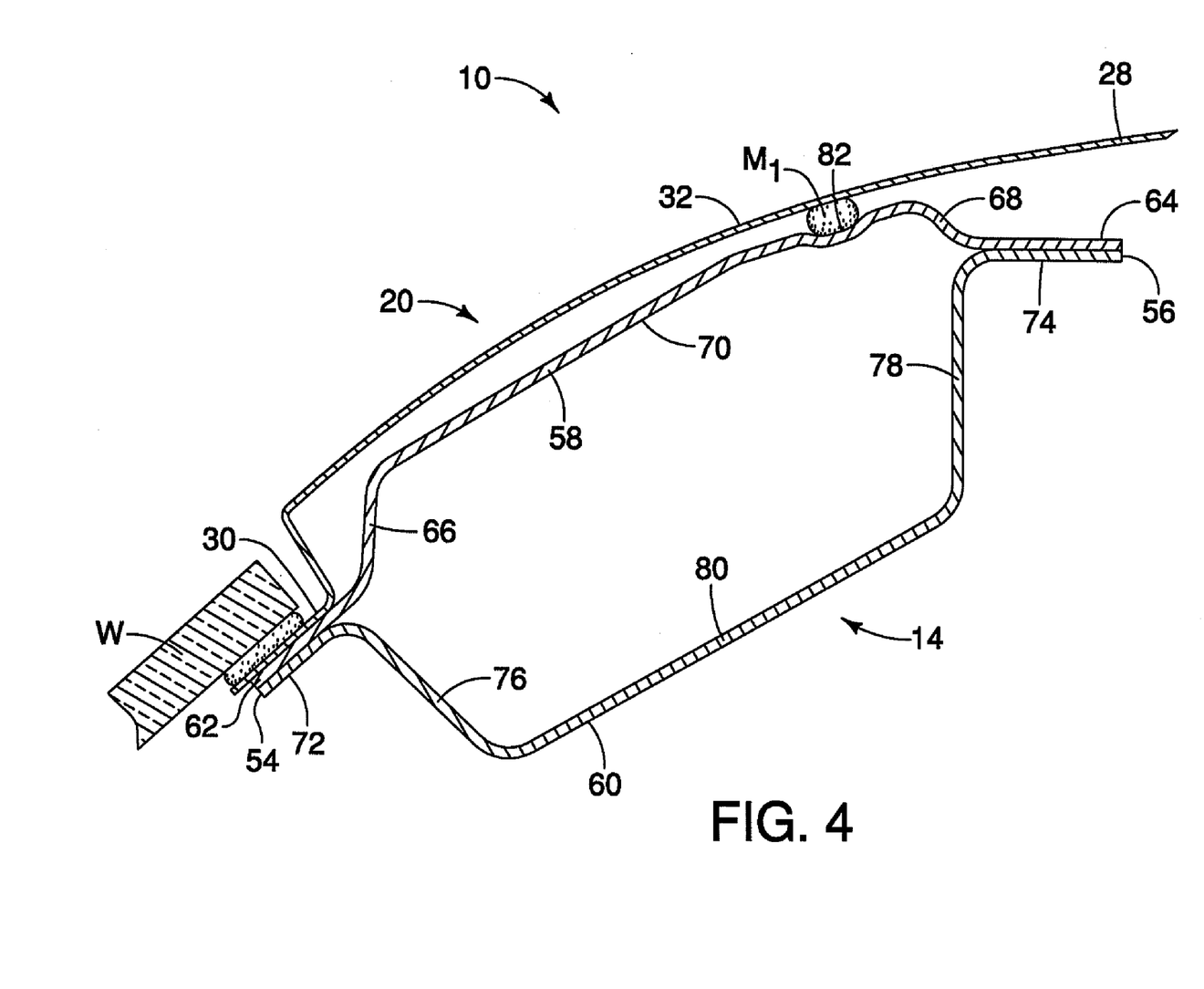
FIG. 4 is a cross sectional view of a front portion of the first vehicle showing details of the front structural support member and the first roof panel in accordance with the present invention.

As shown best in FIGS. 3-6, in a preferred embodiment the front structural support member 14 includes an upper contoured portion 58 and a lower contoured portion 60. The upper contoured portion 58 has a front gusset 62, a rear gusset 64, a front rib portion 66, a rear rib portion 68 and a central portion 70 that extends between the front and rear rib portions 66 and 68. The front rib portion 66, the rear rib portion 68 and the central portion 70 form a shallow U-shaped contour when viewed in cross-section, as indicated in FIGS. 4, 6 and 8. The front gusset 62 extends in a direction approximately parallel to and away from the central portion 70. The rear gusset 64 extends in a direction approximately parallel to and away from the central portion 70.

As best shown in FIGS. 4 and 6, the lower contoured portion 60 has a front gusset 72, a rear gusset 74, a front rib portion 76, a rear rib portion 78 and a central portion 80 that extends between the front and rear rib portions 76 and 78. The front rib portion 76, the rear rib portion 78 and the central portion 80 form a U-shaped contour when viewed in cross-section, as indicated in FIGS. 4, 6 and 8. The front gusset 72 extends in a direction approximately parallel to and away from the central portion 80. The rear gusset 74 extends in a direction approximately parallel to and away from the central portion 80.

The front gusset 62 of the upper contoured portion 58 is preferably fixed to the front gusset 72 of the lower contoured portion 60 by, for example, welding or other rigid attachment configuration. The rear gusset 64 of the upper contoured portion 58 is fixed to the rear gusset 74 of the lower contoured portion 60 by, for example, welding or other rigid attachment configuration, thereby forming a rigid tubular structure. The front gusset 62 of the upper contoured portion 58 and the front gusset 72 of the lower contoured portion 60 together define the front edge 54 of the front structural support member 14. The rear gusset 64 of the upper contoured portion 58 and the rear gusset 74 of the lower contoured portion 60 together define the rear edge 56 of the front structural support member 14.

Figure 7:
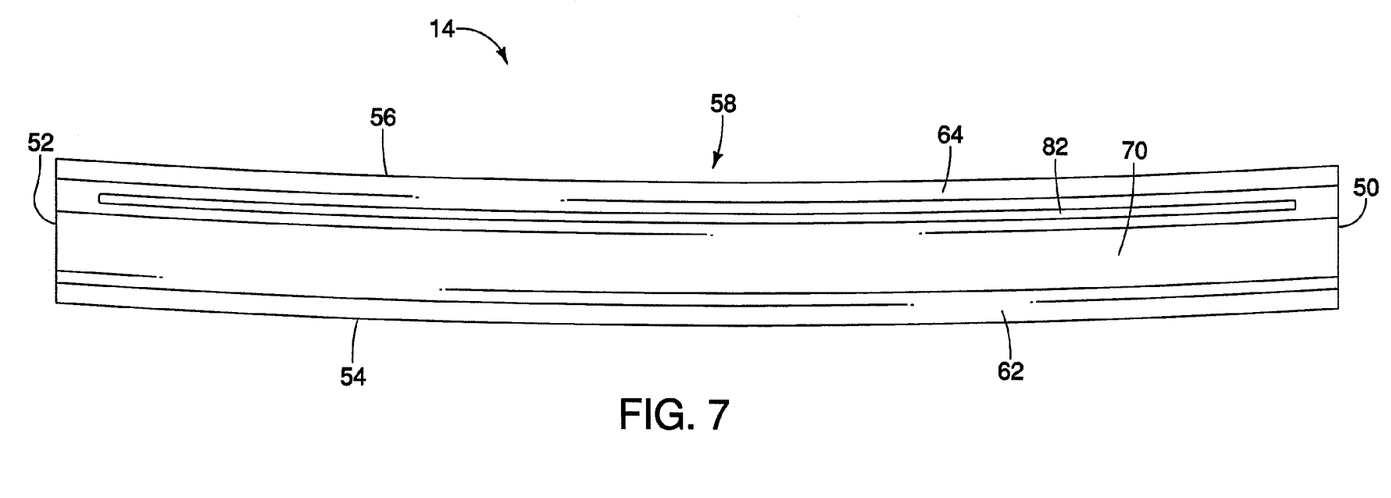
FIG. 7 is a top view of the front structural support member showing contour features of the frontal structural support member in accordance with the present invention.

As best shown in FIG. 7, the central portion 70 of the upper contoured portion 58 includes a recess 82. The recess 82 is an elongated depression or concave contour that is dimensioned to receive mastic $M_1$ (shown in FIG. 4). The mastic $M_1$ is installed in the recess 82 and serves as an adhesive between the raised roof panel 38 and the extension member 40, as described in greater detail below A description of the extension member 40 is now provided with specific reference to FIGS. 6 and 9. The extension member 40 is an elongated C-shaped member, when viewed in cross-section, as in FIG. 6. As indicated in FIG. 9, the overall length of the extension member 40 has an arcuate curvature corresponding to the arcuate curvature of the front structural support member 14.

The extension member 40 has a lower gusset 84, a central portion 86, an upper gusset 88 and a rabbet or recessed portion 90 that is slightly offset from the upper gusset 88. The recessed portion 90 is dimensioned to receive mastic $M_2$, as described in greater detail below.

As shown in FIGS. 6 and 9, the extension member 40 is used in the vehicle body structure 34 of the vehicle 12. Specifically, the extension member 40 is used to bridge a gap that is present when the raised roof panel 38 is installed to the front structural support member 14 and the raised side roof rails 36 of the vehicle body structure 34 of the vehicle 12. More specifically, the lower gusset 84 is shaped and dimensioned for welding to the rear gussets 64 and 74 of the front structural support member 14. The upper gusset 88 is dimensioned for attachment to the raised roof panel 38 rearward from the front flange 30 at a location above and rearward from the front edge 54 of the front structural support member 14. The mastic $M_2$ is installed in the recessed portion 90 and serves as an adhesive between the raised roof panel 38 and the extension member 40.

As shown in FIG. 5, the extension member 40 is attached to the front structural support member 14 and extends vertically from the front structural support member 14 to a position on the roof panel 28 that is located vertically above the front structural support member 14 and closer to the rear edge 56 the front structural support member 14 than the front edge 54 of the front structural support member 14 when the front structural support member 14 is in an installed orientation. Further, the side roof rails 44, the front roof bow 35, the front structural support member 14 and the extension member 40 are all directly attached to the roof panel 28 such that the extension member 40 connects to the roof panel 28 at a location forward from the front roof bow 35. As is also shown in FIG. 5, the extension member 40 connects to the roof panel 28 at a location that is vertically lower than the front roof bow 35. Consequently, the sloped portion 46 of the roof panel 28 is supported by the extension member 40 at a location between the front structural support member 14 and the front roof bow 35.

Lower sections of the vehicle body structure 20 of the vehicle 10 are assembled in a conventional manner, and therefore, description of the assembly processes are omitted for the sake of brevity. A description of the assembly of the front structural support member 14 and the roof panel 28 to the vehicle body structure 20 of the vehicle 10 is now provided.

Specifically, the front structural support member 14 is formed with the first A-pillar attachment end 50, the second A-pillar attachment end 52, the front edge 54 extending between the first and second A-pillar attachment ends 50 and 52, and the rear edge 56 extending between the first and second A-pillar attachment ends 50 and 52. The pair of A-pillars 22 are disposed at opposite sides of the vehicle body structure 20. The first A-pillar attachment end 50 is then fixed to one of the A-pillars 22 by, for example, welding. The second A-pillar attachment end 52 is fixed to the other of the A-pillars 22 by, for example, welding. Thereafter, the roof panel 28 is installed to the front structural support member 14 and fixed thereto by, for example, welding. More specifically, the front flange 30 (a front edge) of the roof panel 28 is fixed or otherwise welded to the front edge 54 of the front structural support member 14. At a predetermined time, the mastic Ml is applied to the recess 82 of the central portion 70 of the upper contoured portion 58 of the front structural support member 14. Thus, when the roof panel 28 is installed to the front structural support member 14, the mastic Ml is compressed slightly between the roof panel 28 and the front structural support member 14 providing adhesion therebetween. Consequently, since the recess 82 is located proximate the rear edge 56 of the front structural support member 14, the rear edge 56 of the front structural support member 14 is fixed to an area of the roof panel 28 rearward from the front edge 54 of the roof panel 28.

Lower sections of the vehicle body structure 34 of the vehicle 12 are assembled in a conventional manner, and therefore, description of the assembly processes are omitted for the sake of brevity. A description of the assembly of another of the front structural support member 14 and the raised roof panel 38 to the vehicle body structure 34 of the vehicle 12 is now provided.

Specifically, the A-pillars 22 are disposed at opposite sides of the vehicle body structure 34. The first A-pillar attachment end 50 of the front structural support member 14 is then fixed to one of the A-pillars 22 by, for example, welding. The second A-pillar attachment end 52 of the front structural support member 14 is fixed to the other of the A-pillars 22 by, for example, welding.

Prior to or after installation of the front structural support member 14 to the A-pillars 22 the extension member 40 is fixed to the rear edge 56 of the front structural support member 14. The extension member 40 can be welded or otherwise rigidly fixed to the rear gusset 64 of the upper contoured portion 58 and/or the rear gusset 74 of the lower contoured portion 60 of the front structural support member 14.

The extension member 40 is attached to the front structural support member 14 to extend vertically from the front structural support member 14 to a position on the raised roof panel 38 that is located vertically above the front structural support member 14 and closer to the rear edge 56 the front structural support member 14 than the front edge 54 of the front structural support member 14 when the front structural support member 14 is in an installed orientation shown in FIG. 5.

Thereafter, the raised roof panel 38 is installed to the front structural support member 14 and fixed thereto by, for example, welding. More specifically, the front flange 30 (a front edge) of the roof panel 38 is fixed or otherwise welded to the front edge 54 of the front structural support member 14. At a predetermined time, the mastic $M_2$ is applied to the recessed portion 90 of the extension member 40. Thus, when the raised roof panel 38 is installed to the front structural support member 14, the mastic $M_2$ is compressed slightly between the raised roof panel 38 and the front structural support member 14 providing adhesion therebetween.

As shown in FIGS. 6 and 9, the extension member 40 extends upward from the rear edge 56 of the front structural support member 14 a distance $D_1$ that is at least equal to the overall height $D_2$ of the front structural support member 14 when the front structural support member 14 is in the installed orientation. Consequently, the raised roof panel 38 is installed to the extension member 40 on the front structural support member 14 with the raised roof panel 38 being disposed at the distance $D_1$ (a height measurement) above the rear edge 56 of the front structural support member 14, as shown in FIG. 6. Further, the extension member 40 is dimensioned to extend laterally from a point proximate the first A-pillar attachment end 50 to a point proximate the second A-pillar attachment end 52.

It should further be noted that in both vehicle 10 and vehicle 12, that the front edge 54 of the front structural support member 14 is disposed vertically lower than at least the majority of the rear edge 56 of the front structural support member 14 when the front structural support member 14 in the installed orientation (as shown in FIGS. 4 and 6).

It should be understood from the drawings and the description herein that the extension member 40 does not need to be vertically oriented to be within the scope of the invention. Specifically, the extension member 40 can be inclined with respect to vertical and need not be perpendicular to horizontal. For example, in alternative configurations, the extension member 40 can be angled rearward or angled forward from the front structural support member 14 in order to provide support for the roof panel 38.

The vehicles 10 and 12 include many conventional components that are well known in the art. Since these components are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle body structure comprising:
   a roof panel;
   a front structural support member including a first A-pillar attachment end, a second A-pillar attachment end, a front edge extending between the first and second A-pillar attachment ends and a rear edge extending between the first and second A-pillar attachment ends; and
   an extension member attached to the front structural support member to extend vertically from the front structural support member to a position on the roof panel that is located vertically above the front structural support member and closer to the rear edge of the front structural support member than the front edge of the front structural support member when the front structural support member is in an installed orientation, the extension member having a substantially channel shaped cross-section.

2. The vehicle body structure according to claim 1, further comprising
   a pair of A-pillars disposed at opposite sides of the vehicle body structure with the first and second A-pillar attachment ends of the front structural support member being fixedly attached to respective upper ends of the A-pillars.

3. The vehicle body structure according to claim 2, wherein the front edge of the front structural support member is disposed vertically lower than at least the majority of the rear edge of the front structural support member when the vehicle body structure in the installed orientation.

4. The vehicle body structure according to claim 1, wherein the front structural support member includes an upper contoured portion having a front gusset and a rear gusset with the extension member being fixed to the rear gusset.

5. The vehicle body structure according to claim 4, wherein the front structural support member further includes a lower contoured portion having a front gusset fixed to the front gusset of the upper contoured portion and a rear gusset fixed to the rear gusset of the upper contoured portion to form a tubular member.

6. The vehicle body structure according to claim 1, wherein the extension member includes a front structural support member attachment portion, a roof panel attachment portion and a center portion extending between the front structural support member attachment portion and the roof panel attachment portion, the front structural support member attachment portion, the roof panel attachment portion and the center portion defining the substantially channel shaped cross-section of the extension member.

7. The vehicle body structure according to claim 6, wherein the roof panel attachment portion is directly attached to the roof panel.

8. The vehicle body structure according to claim 6, wherein the roof panel attachment portion is attached to the roof panel along the length of the extension member.

9. The vehicle body structure according to claim 6, wherein
the roof panel attachment portion is attached to the roof panel between an area adjacent to the first A-pillar attachment end of the front structural support member and an area adjacent to the second A-pillar attachment end of the front structural support member.

10. The vehicle body structure according to claim 6, wherein
the center portion of the extension member is positioned forward of the front structural support member attachment portion and the roof panel attachment portion, and the front structural support member attachment portion and the roof panel attachment portion of the extension member extend rearward from the center portion of the extension member relative to the vehicle body structure.

11. The vehicle body structure according to claim 10, wherein
the roof panel attachment portion extends in a direction parallel to an adjacent portion of the roof panel and is angularly offset from the center portion of the extension member by an obtuse angle.

12. The vehicle body structure according to claim 6, wherein
the center portion extends in a substantially vertical direction when installed in the vehicle body structure.

13. The vehicle body structure according to claim 6, wherein
the front structural support member includes a rear gusset that extends laterally relative to the vehicle body structure along the rear edge of the front structural support member, and
the front structural support member attachment portion of the extension member is fixedly attached to the rear gusset.

14. A vehicle body structure comprising:
a roof panel;
a front structural support member including a first A-pillar attachment end, a second A-pillar attachment end, a front edge extending between the first and second A-pillar attachment ends and a rear edge extending between the first and second A-pillar attachment ends; and
an extension member attached to the front structural support member to extend vertically from the front structural support member to a position on the roof panel that is located vertically above the front structural support member and closer to the rear edge the front structural support member than the front edge of the front structural support member when the front structural support member is in an installed orientation, the extension member being directly attached to the roof panel.

15. The vehicle body structure according to claim 14, wherein
the extension member includes a front structural support member attachment portion, a roof panel attachment portion and a center portion extending between the front structural support member attachment portion and the roof panel attachment portion, the extension member having a substantially channel shaped cross-section defined by the front structural support member attachment portion, the center portion and the roof panel attachment portion.

16. The vehicle body structure according to claim 14, wherein
the roof panel attachment portion is attached to the roof panel between an area adjacent to the first A-pillar attachment end of the front structural support member and an area adjacent to the second A-pillar attachment end of the front structural support member.

17. The vehicle body structure according to claim 15, wherein
the center portion of the extension member extends between a forward edge of the roof panel attachment portion and a forward edge of the front structural support member attachment portion, and the front structural support member attachment portion and the roof panel attachment portion of the extension member extend rearward from the center portion of the extension member relative to the vehicle body structure.

18. The vehicle body structure according to claim 17, wherein
the roof panel attachment portion extends in a direction parallel to an adjacent portion of the roof panel and angularly offset from the center portion of the extension member by an obtuse angle.

19. The vehicle body structure according to claim 15, wherein
the center portion extends in a substantially vertical direction when installed in the vehicle body structure.

20. The vehicle body structure according to claim 15, wherein
the front structural support member includes a rear gusset that extends laterally relative to the vehicle body structure along the rear edge of the front structural support member, and
the front structural support member attachment portion of the extension member is fixedly attached to the rear gusset.

21. A vehicle body structure comprising:
a roof panel having a sloped portion;
a pair of side roof rails extending longitudinally relative to the vehicle body structure along lateral sides of the roof panel;
a front roof bow extending between the side roof rails;
a front structural support member including a first A-pillar attachment end, a second A-pillar attachment end, a front edge extending between the first and second A-pillar attachment ends and a rear edge extending between the first and second A-pillar attachment ends; and
an extension member attached to the front structural support member to extend vertically from the front structural support member to a position on the roof panel that is located vertically above the front structural support member and closer to the rear edge the front structural support member than the front edge of the front structural support member when the front structural support member is in an installed orientation, the pair of side roof rails, the front roof bow, the front structural support member and the extension member all being directly attached to the roof panel such that the extension member connects to the roof panel at a location forward from the front roof bow.

22. The vehicle body structure according to claim 21, wherein
the extension member connects to the roof panel at a location that is vertically lower than the front roof bow.

23. The vehicle body structure according to claim 21, wherein
the sloped portion of the roof panel is supported by the extension member at a location between the front structural support member and the front roof bow.

* * * * *